Aug. 23, 1932.  W. C. LAUGHLIN ET AL  1,872,759
CLEANING DEVICE FOR SEWAGE FILTER BEDS
Filed July 28, 1931    2 Sheets-Sheet 1

INVENTORS
William C. Laughlin
and Abraham B. Asch
BY
their ATTORNEY

INVENTORS
William C. Laughlin
and Abraham B. Asch
BY
their ATTORNEY

Patented Aug. 23, 1932

1,872,759

UNITED STATES PATENT OFFICE

WILLIAM C. LAUGHLIN, OF KEW GARDENS, AND ABRAHAM B. ASCH, OF BROOKLYN, NEW YORK, ASSIGNORS TO FILTRATION EQUIPMENT CORPORATION, OF NEW YORK, N. Y., A CORPORATION OF DELAWARE

CLEANING DEVICE FOR SEWAGE FILTER BEDS

Application filed July 28, 1931. Serial No. 553,526.

Our present invention relates to sewage clarification tanks, more particularly to tanks of the character which are furnished with filter beds for filtering out impurities; and the invention has for its purpose and object to provide an improved clarification tank embodying improved means for cleaning the filter beds therein without interfering either with the filtering operations or with the processes of sewage treatment, transpiring within the tank.

An object of the invention is to provide, in a sewage clarification tank, a novel filter bed cleaning system and arrangement whereby the solids and impurities, entrapped and enmeshed in the filter bed, will be separated from the effluent liquid. A further object is to collect the separated solids and impurities and to draw the same out of the tank for re-circulation or for such other disposition as may be desired, while permitting the clarified effluent to rise to its discharge outlet by reason of its natural movement towards its liquid level.

For the attainment of its objects, the invention in its evolvement has in view the provision of a water-head for receiving the inflowing sewage liquid or material and the level of this water-head is at an elevation above the discharge outlet for the clarified effluent. Over the filter bed is arranged a traveling filter bed cleaning device having a collector chamber; and the filter bed and cleaning device are so relatively positioned that the inlet to the collector chamber is below the level of the discharge outlet, so that by reason of the elevation of the water-head, the liquid in the immediate territory of the cleaning device will be forced over the inlet into the collector chamber, whereas the liquid outside of the territory of the cleaning device will be forced to the elevation necessary to pass through the discharge outlets. According to a feature of the arrangement, the inlet to the collector chamber is restricted; and it is made adjustable as to height so that the level of this inlet may be varied with respect to the level of the water-head. By virtue of this provision, the pressure and velocity of the liquid upwardly through the filter bed in the territory of the cleaning device may be controlled.

More particularly, the present invention has for an object the provision of a filter bed which includes as the filtering medium for the clarification of the sewage liquid, a mass of loose magnetite particles, or of loose magnetite ore particles or bodies, adapted to be strongly attracted by a magnet. It further has for an object to provide the cleaning device with an electromagnet by means of which, through alternate energization and de-energization, to stir up the magnetite so that the matter and dirt enmeshed therein will be promptly released into the pressural tide of sewage liquid which moves upwardly through the collector chamber inlet and thence into the collector chamber itself.

The arrangement also includes the provision of a discharge pump for pumping the dirty liquid and impure substances from the collector chamber as rapidly as they accumulate therein.

It is within the province of the invention to provide a clarification tank which may have a plurality of filter beds of magnetite and, in correspondence therewith, a plurality of cleaning devices with magnets for operating on the magnetite; and further to provide an overhead carriage or trolley which carries a plurality of cleaning devices together with the pumps and discharge lines for discharging the dirty liquids from the cleaning devices. The carriage is equipped with wheels which turn on guide track rails positioned along the top of the tank; and it may be equipped with a power unit whereby to be self-propelled on the track rails.

By means of the carriage or trolley, the cleaning devices are moved continuously along the filter beds so that the magnetite composing the beds is not permitted to become sufficiently dirty to obstruct filtration. The cleaning operation may be conducted continuously along the bed and by reason of the water-head may be carried out by hydraulic means in conjunction with the magnetic means.

In the accompanying drawings, we have shown our invention, by way of example, as associated with a clarification tank constructed with two filter beds and with a traveling carriage for supporting two cleaning devices, these parts having respectively the general construction and arrangement illustrated and described in more detail in our companion application for Letters Patent of the United States, filed August 4, 1931, Serial No. 555,054. The present invention is illustrated and described as an alternative example in said companion application, but certain novel features of the invention herein claimed are not claimed therein.

In illustrating a particular example of our invention, we have not intended to limit the broader aspects of the invention to the particular tank shown, nor to a tank for filtering or treating sewage only. The invention involves principles of general application which may be variously adapted and modified for filtering and treating operations, not only for sewage, but of liquids of various kinds requiring clarification, and it will be recognized that the combination of a magnetite filtering bed and magnetic means for agitating the bed may be employed to advantage either in a tank, in a filtering bed or construction built on the ground, and in other filtering devices and erections. Therefore, it is our intention to cover in some of the broader claims hereunto appended, these principles in any modification of construction and design in which they may be embodied, as well as to cover the special adaptation of such principles here illustrated in connection with a sewage tank.

The nature of the general principles and objects above referred to, as well as other and additional objects and advantages, which will become apparent as the description proceeds, and the manner in which the new and novel features of construction and operating are embodied in practical form and means, are explained in the following detail description of the particular combination and arrangement of parts herein illustrated as an example.

In the drawings, wherein like characters of reference indicates like parts throughout the several views:—

Figure 1:
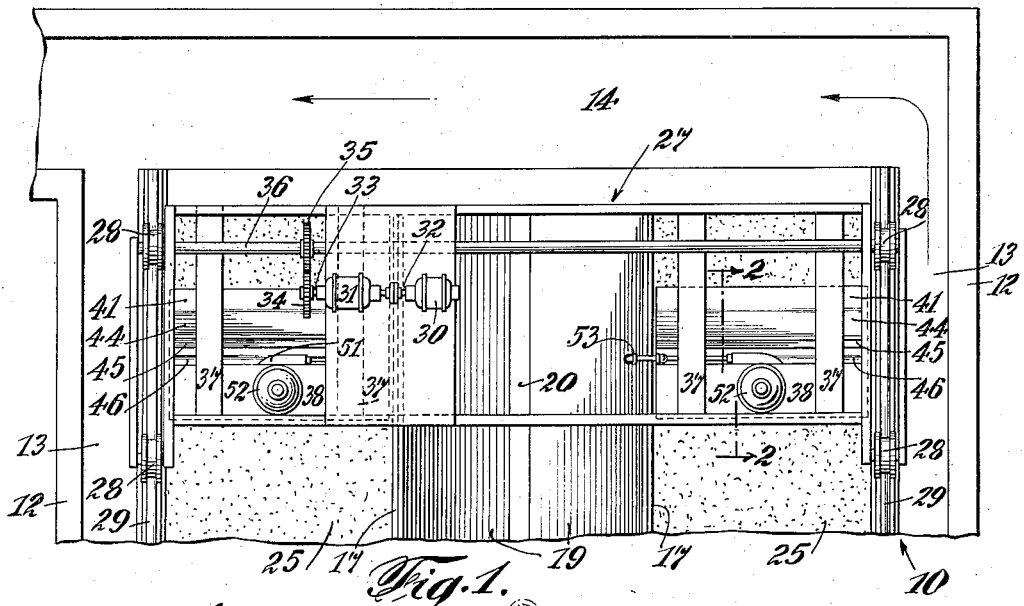
Figure 1 represents a top plan view, showing an end portion of a clarification tank provided with two magnetite filter beds and a water-head, and showing also the traveling carriage and cleaning devices carried thereby for operating upon the magnetite filter beds.
Figure 2:
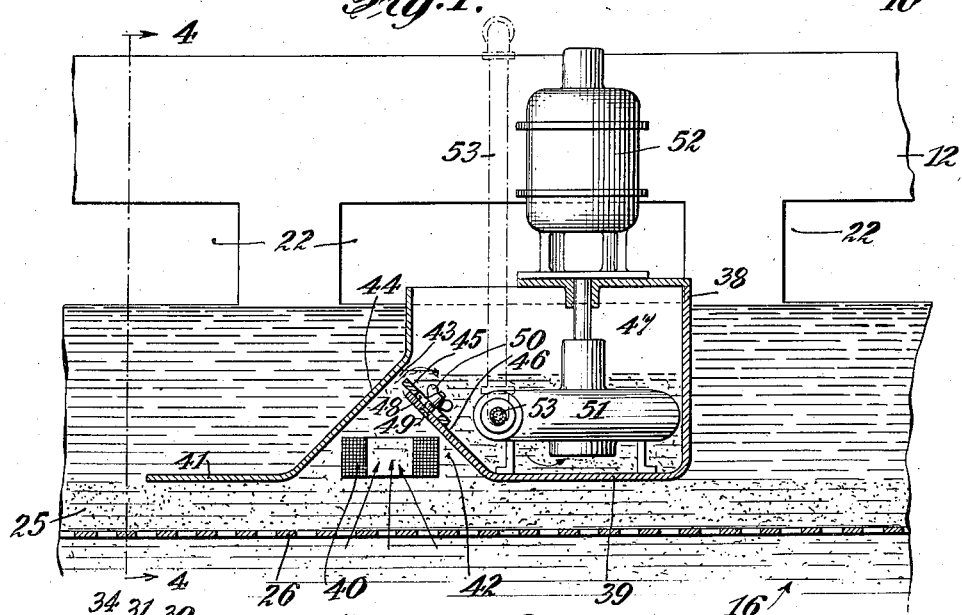
Fig. 2 is a detail vertical sectional view, longitudinally of one of the cleaning devices, taken on the line 2—2 of Fig. 4; and, with respect to the tank, looking in a direction transversely thereof as indicated by the arrows associated with line 2—2 of Fig. 1 and below the plane of the traveling carriage.
Figure 5:
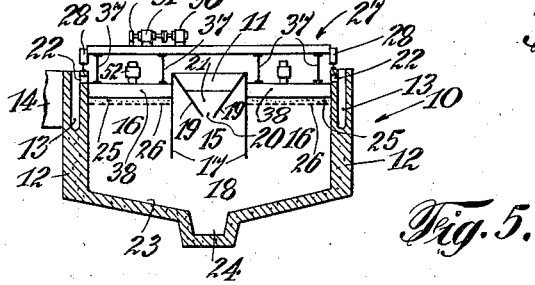
Figure 3:
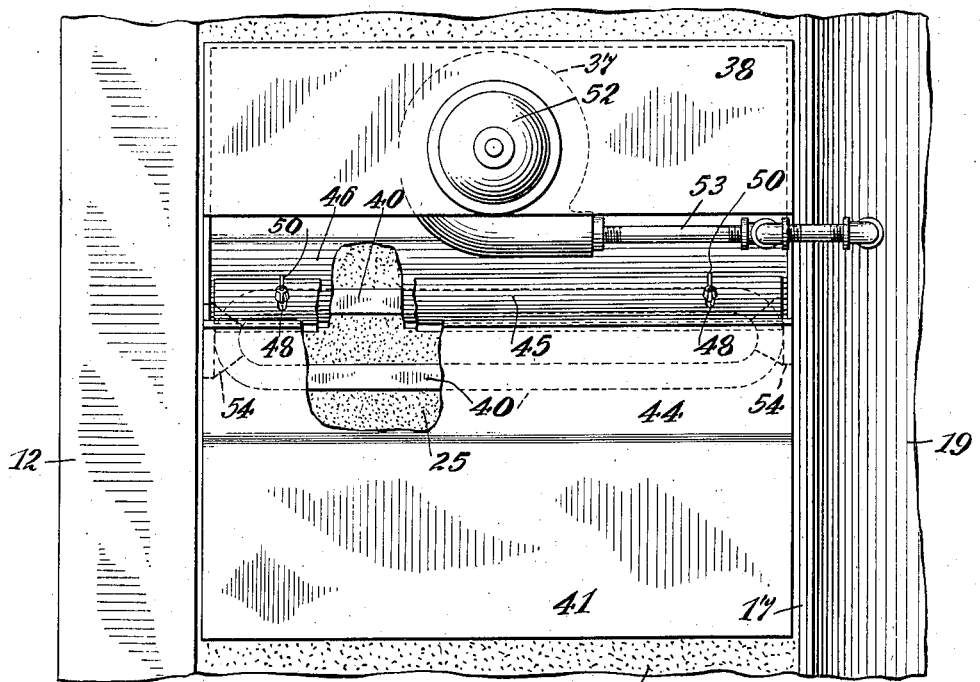
Fig. 3 is a top plan view of the parts shown in Fig. 4.
Figure 4:
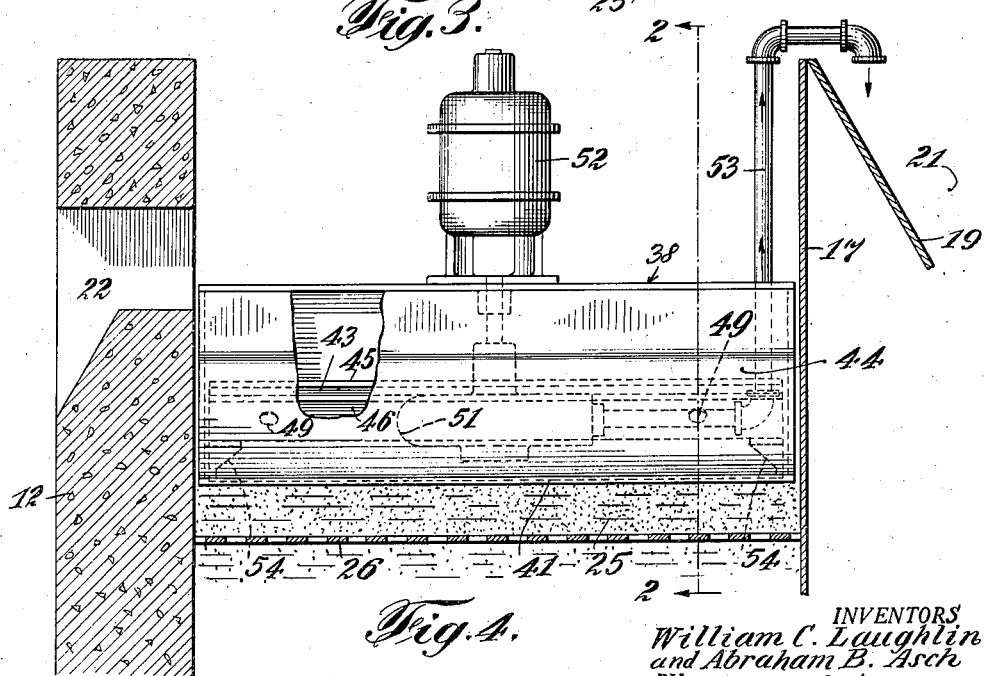

Fig. 4 represents a cross sectional view through one of the filter beds and showing the associated cleaning device in end elevation with a portion of the tank wall broken away, this view also showing the pump discharge line for returning the dirty liquid to the water-head; and Fig. 5 is a diagrammatic illustration of a clarification tank, showing the arrangement of the water-head for causing the sewage liquid to move upwardly through the two filter beds to the effluent discharge outlets, and showing also the traveling carriage and cleaning devices carried thereby for cleaning the filter beds.

The sewage clarification tank, fractionally illustrated in the accompanying drawings and in which we have shown an embodiment of our invention as a preferred example, is denoted in general by the reference numeral 10, and this tank in practice may consist of an elongated structure built from concrete or any material that may be suitable or approved for the purpose. One end of the tank is provided with an inlet 11 (Fig. 5) for the inflow of the sewage liquid. The opposite longitudinal side walls 12, 12 of the tank are each provided with a launder or trough 13 for carrying away the effluent, and these launders or troughs empty into a main conduit 14 by which the effluent is conveyed away for disposition in any manner desired.

The interior of the tank is divided into a central chamber 15 and side chambers 16 by baffles 17 located in the upper portion of the tank and which terminate at their lower ends intermediate the height of the tank so as to provide in the bottom portion of the tank an open chamber 18 with which the central chamber 15 and each of the side chambers 16 can communicate. The upper portion of the chamber 15 is divided off by downwardly extending baffles 19 which converge as they extend downwardly in order to provide a restricted feed opening 20. The inlet 11 is in direct communication with the chamber 21 between the baffles 19, and the sewage fluid which fills the chamber 21 constitutes a water-head the level of which is elevated above the spaced outlets 22 provided in the longitudinal sides of the tank for the discharge of the effluent into the launders 13. By reason of the provision of the water-head, a siphoning action is provided for moving the liquid upwardly through the side chambers 16 for discharge through the outlets 22. It is to be noted here that the central chamber 15, two side chambers 16, 16 and water-head chamber 21 all extend lengthwise of the tank, with the central chamber 15 and water-head chamber 21 occupying positions between the side chambers 16, 16.

The character of the sewage liquid which enters through the inlet 11 and fills the tank, including the water-head 21, central chamber 15, bottom chamber 18 and side chambers 16, 16, need not be treated of herein. Also the details of the processes whereby the sewage solids, whether colloidal or suspended, are first converted into a slime-like strata of cellulose and sewage solids, and then when in such state are subjected to coagulation so that the imbibed water will be given up, need not be explained herein. These matters are explained at length in the companion application above referred to. It is sufficient to state here that the coagulated colloids including the solids of the sewage, which have a higher specific gravity than the water, settle downwardly to the bottom of the tank, while the lighter water, solids, and impurities rise in the side chambers under siphoning action to the discharge outlets 22. The relatively heavy matter or sludge settles onto the sloping bottom portions 23 of the tank and gradually moves to the channel 24 from where it is drawn off by a sludge pipe (not shown) or other suitable discharging medium.

In the upper portion of each of the side chambers 16 and below the plane of the discharge outlets 22, is provided a filter bed. The water and impurities rising in the side chambers 16 by the siphoning action, pass upwardly through the filter beds where the filtering out of the impurities takes place, and the clear water effluent resulting from the filtering action rises upwardly for its discharge through the outlets 22. In the present instance, the filter beds consist of a mass of magnetite particles or bodies 25, or of magnetite ore, adapted to be strongly attracted by an energized magnet. The magnetite beds are supported upon suitable filter screens 26.

The apparatus for cleaning the filter beds includes a traveling carriage which is designated in general by the numeral 27, and which may consist of any suitable framework capable of carrying the various parts which make up the complete operative apparatus for cleaning the beds. At its opposite ends the carriage is provided with a pair of wheels 28 which turn on track rails 29 provided upon the longitudinal sides 12 and inwardly of the positions of the effluent launders 13. These track rails provide for the movement of the carriage for the full length of the filter beds so that the magnetite can be cleaned throughout the length of the beds. By preference the carriage is furnished with its own power means, and such means may consist of an electric motor 30 which is mounted upon the framework, and in association with the motor, a reduction gear box 31 whereby, from the motor shaft 32, to operate the driving shaft 33 at reduced speed. The driving shaft carries a gear 34 which is in driving engagement with a gear 35 mounted upon a shaft or axle 36. At each end of the carriage, one of the two track wheels is mounted on the shaft or axle 36. Two filter cleaning devices are provided, one for each of the filter beds. These cleaning devices are suspended from the carriage by means of suitable beams 37. Inasmuch as the two cleaning devices are duplicates, a detail description of one of them will suffice for the other.

Each cleaning device includes a cleaner or cleaning tank 38 of a size to fit, transversely of the bed, between the baffle 17 and side wall 12, the fit in this regard being such that while the opposite sides of the cleaner come in close adjacency to said respective parts, yet they do not contact with said parts in a way to produce frictional resistance. The bottom 39 of the cleaner, in the direction of the length of the magnetite bed, is such as will define a definite territory or area of resistance for the agitation of the magnetite, accomplished in part by the pressure and velocity of the liquid rising upwardly through the magnetite and in part by an electromagnet 40. In the present instance, the dimension of the cleaner, lengthwise of the bed, is increased by the provision of an apron or strip 41 which is in alignment with the bottom 39. The cleaner, between the bottom 39 and apron 41, and for the full dimension of the cleaner between the baffle 17 and the side wall 12, is provided with a neck or inlet opening 42 wherein the electro-magnet is disposed just above the level of the magnetite bed. The neck or inlet opening 42 communicates at its top with a restricted feed opening 43 formed between the baffle 44 and a weir 45 mounted upon the baffle 46. The water rising in the inlet 42 between the baffles 44 and 46 passes over the weir 45 and falls into the interior chamber 47 of the cleaner. The weir 45 is connected with the baffle 46 for relative adjustment with respect thereto, the particular connection indicated in the present instance for this purpose consisting in the provision of suitable elongated slots 48 through which are passed threaded bolts 49 provided with wing nuts 50.

Under the foregoing construction, it will be observed that the inlet 42 is located substantially midway the length of the cleaner, so that for the territory of resistance afforded by the cleaner, the dirty water and impurities will tend under siphoning action to rise through the inlet 42 and pass over the weir into the interior chamber 47.

It will be apparent that by reason of the elevation of the water-head, any adjustment of the weir in an upward direction will influence the pressure and velocity of the liquid upwardly through the filter bed for the territory occupied by the tank. The weir, therefore, may be adjusted in the precise position which will cause the magnetite between the screen 26 at the bottom of the bed and the bottom 39 and apron 41 at the top of the bed, to be kept on the verge of moving upwardly by the pressure and velocity of the water moving under siphoning action to the inlet 42.

The magnetite within the area of the bottom 39 and apron 41 is attracted and moves toward the electro-magnet when the latter is energized. When the electro-magnet is de-energized, the magnetite drops back on the screen. The magnetite is caused to jump up and fall back as often as the current is turned on and off. In this way, the dirty water, solids, and impurities enmeshed and entangled in the magnetite underneath the territory of the tank and its apron, will be released for movement with the stream into the interior of the chamber 47. The magnetite in falling back upon the screen, raps upon the screen and aids in keeping the screen itself clean. The use of an alternating current will cause the screen itself to vibrate. This will also aid in keeping the screen clean. The weir 45 may be so adjusted that the magnetite will constantly be kept on the verge of moving upwardly by reason of the pressure of the siphoned liquid. When the magnetite is thus buoyed up by the liquid pressure, little power on the part of the magnet is required in order to attract the magnetite.

Outside the territory occupied by the cleaner and its apron, the water which rises from the filter bed where the magnetite has not been agitated, is clean and rises under the siphoning action to the discharge outlets 22. The cleaner, it will be observed, shuts out the clean water, so that only the dirty water and impurities released through the agitation of the magnetite, will enter the chamber 47. The dirty water is removed from the chamber 47 by means of a centrifugal pump 51 operated by an electric motor 52, located upon the top of the tank where it is above the level of the flow of clean water through the discharge openings 22. The dirty water and impurities pumped out by the pump may be disposed of in any suitable manner. In the present instance, we show a discharge pipe line 53 connected with the pump and arranged to discharge the dirty water and impurities into the water-head 21 for recirculation through the clarification tank. The electro-magnet 40 may be supported in the inlet 42 in any suitable manner. In the present instance, members 54 support the electromagnet from the cleaning tank. These hanger members may themselves consist of any suitable insulation material or they may carry insulation material interposed between themselves and the electromagnet, all in any known or approved manner for the support or suspension of an electrical device of this character. In practice, if found desirable or necessary, the parts 39, 41, 44 and 46 may consists of insulation, or the faces thereof which confront the magnetite bed, may be provided with a coating or covering of insulation material.

The carriage or trolley, carrying the two cleaning devices, moves forwardly and backwardly along the elongated tank so as to intervally clean all portions of the two magnetite beds from one end thereof to the other. The carriage is kept in continuous movement and the object is to clean all segments of the magnetite beds so frequently that there will be no opportunity for the magnetite to become dirty. The cleaner the beds are kept the cleaner the effluent will be. Owing to the provision of the water-head, which induces a flow of the liquid into the dirty water chamber of each of the cleaning tanks and as well through the higher discharge outlets 22, and the fact that each cleaning tank shuts out the clear water effluent while defining a territory of resistance or agitation wherein the dirty water and impurities within the magnetite bed are released for movement with the stream into the dirty water chamber, there results a constant separation of the impurities from the bed so that in practice the latter is practically free of solids and impurities. By returning the separated dirty water and impurities back to the water-head, these are put into recirculation for retreatment within the clarification tank.

It is to be understood that, in practice, the cleaning devices of our invention may be made for use in connection with circular clarification tanks, or square clarification tanks, as well as for elongated tanks of the type herein particularly referred to.

While our invention has been illustrated and described with some degree of particularity, it is realized that in practice various changes and alterations may be made therein, and further that the invention is capable of embodiment in many different tank constructions. It has been sought herein to illustrate only such an embodiment as will suffice to exhibit the character of the invention. Reservation is, therefore, made to the right and privilege of changing the form of the details of construction or otherwise altering the arrangement of the parts without departing from the spirit or scope of the invention or the scope of the appended claims.

We claim:—

1. Means for cleaning a bed of filtering magnetite or like magnetic material, the same comprising means for maintaining a pressural movement of liquid upwarly through and to a level above the bed, a movably mounted device adapted to define over the magnetite a localized resistance area to the upward movement of the liquid and having a chamber for receiving liquid from such area, and magnetic means for influencing movement of the magnetite within the resistance area.

2. Means for cleaning a bed of filtering magnetite or like magnetic material, the same comprising means for maintaining a pressural movement of liquid upwardly through and to a level above the bed, a movably mounted device adapted to define over the magnetite a localized resistance area to the upward movement of the liquid and having a chamber for receiving liquid from such area, magnetic means for influencing movement of the magnetite within the resistance area, and means for pumping liquid from said chamber.

3. Means for cleaning a bed of filtering magnetite or like magnetic material, the same comprising means for maintaining a pressural movement of liquid upwardly through and to a level above the bed, a movably mounted device provided with a chamber and an inlet thereto, said device being adapted to define over the magnetite and at the sides of the inlet a localized resistance area to the upward movement of the liquid, to cause liquid from the resistance area to feed through the inlet and into the chamber, and an electromagnet in the inlet for influencing movement of the magnetite within the resistance area.

4. A filter bed cleaning device comprising, with a bed of filtering magnetite and means for forcing liquid under pressure up through and to a liquid level above the bed, a tank constructed to define over the magnetite a resistance area to the upward movement of the liquid and provided with an inlet for feeding liquid from the resistance area into the tank at a level below the liquid level, and an electromagnet within the resistance area for influencing movement of the magnetite therein.

5. A filter bed cleaning device comprising, with a bed of filtering magnetite and means for forcing liquid under pressure up through and to a liquid level above the bed, a tank constructed to define over the magnetite a resistance area to the upward movement of the liquid and provided with an inlet for feeding liquid from the resistance area into the tank at a level below the liquid level, means for moving the tank, and an electromagnet carried by the tank for influencing movement of the magnetite within the resistance area.

6. A filter bed cleaning device comprising, with a bed of filtering magnetite and means for forcing liquid under pressure up through and to a liquid level above the bed, a tank provided with a chamber and an inlet thereto below the liquid level, means on the tank adapted to define over the magnetite and at the sides of the inlet a localized resistance area to the upward movement of the liquid, to cause liquid in the resistance area to move to the inlet and through the inlet into the chamber, and an electromagnet in the inlet for influencing movement of the magnetite in the liquid moving to the inlet.

7. A filter bed cleaning device comprising, with a bed of filtering magnetite and means for forcing liquid under pressure up through and to a liquid level above the bed, a tank and a feed, means on the tank adapted to define over the magnetite and at the sides of the inlet a localized resistance area to the upward movement of the liquid, to cause liquid in the resistance area to move to the inlet and through the inlet and feed into the chamber, an electromagnet in the inlet for influencing movement of the magnetite in the liquid moving to the inlet, and a weir for the feed, controlling the elevation at which the liquid passes into the chamber.

8. The tank for use in cleaning a bed of filtering magnetite, having a chamber therein, an upwardly extending inlet having a feed into the chamber, means on the tank adapted to define over the magnetite and at the sides of the inlet a localized resistance area to liquid moving upwardly through the magnetite with a pressure sufficient to attain a liquid level higher than the feed, so that liquid in the resistance area will by pressure move to the inlet and through the inlet and feed into the chamber, and an electromagnet carried by the tank for influencing movement of the magnetite in the liquid moving to the inlet.

9. The tank for use in cleaning a bed of filtering magnetite, having a chamber therein, an upwardly extending inlet having a feed into the chamber, means on the tank adapted to define over the magnetite and at the sides of the inlet a localized resistance area to liquid moving upwardly through the magnetite with a pressure sufficient to attain a liquid level higher than the feed, so that liquid in the resistance area will by pressure move to the inlet and through the inlet and feed into the chamber, an electromagnet carried by the tank for influencing movement of the magnetite in the liquid moving to the inlet, and a weir for the feed adjustable upwardly and downwardly for controlling the elevation at which the liquid passes into the chamber.

10. The tank for use in cleaning a bed of filtering magnetite, having a chamber therein, an upwardly extending inlet having a feed into the chamber, means on the tank adapted to define over the magnetite and at the sides of the inlet a localized resistance area to liquid moving upwardly through the magnetite with a pressure sufficient to attain a liquid level higher than the feed, so that liquid in the resistance area will by pressure move to the inlet and through the inlet and feed into the chamber, an electromagnet carried by the tank for influencing movement of the magnetite in the liquid moving to the inlet, and means for removing liquid from the chamber comprising a pump in the chamber and a discharge line for the pump extending exteriorly of the chamber.

11. The combination with a sewage tank having means for maintaining an upward movement of the sewage liquid and provided with a bed of magnetite up through which the liquid passes to be thereby filtered to produce clear effluent, of a carriage movable along the top of the tank, a cleaning device suspended from the carriage for movement along the magnetite and in the clear effluent, said device being formed to define a localized resistance area to the upward movement of the liquid and having a collector chamber into which the liquid moves from such area, to be thereby separated from the clear effluent, and an electromagnet on the device for influencing movement of the magnetite within the resistance area to release into the liquid moving into the collector chamber, the dirt enmeshed in the magnetite.

12. In a device for cleaning a magnetite filter bed, a tank and means supporting the tank for movement along the bed, said tank having a collector chamber therein for receiving effluent from the bed during movement of the tank along the bed, an inlet through which the effluent moves to said chamber, extending upwardly from the bottom of the tank and feeding into the chamber at an elevation above the bottom of the chamber, and an electromagnet carried by the tank in relation to said inlet and adapted, on energization and de-energization, to attract and release the magnetite of the bed, whereby to release into the effluent destined to move through the inlet, the dirt which is enmeshed in the bed.

13. A tank for use in cleaning a bed of filtering magnetite, said tank having a chamber therein and having an inlet for the passage of liquid into the chamber from the magnetite, and an electromagnet on the tank, disposed in relation to said inlet for influencing movement of the magnetite to release dirt therein into the liquid destined to pass through the inlet into said chamber.

14. A filtering bed comprising a mass of magnetite or the like in combination with positively movable magnetic means adapted to be intermittently energized for acting on the magnetite and causing agitation thereof.

15. In filtering means, the combination with a filtering bed composed of a mass of magnetite, of electromagnetic means for acting on the magnetite and causing agitation thereof, and means for supporting and positively moving the electro-magnetic means along the bed.

16. In a filtering bed, the combination of a screen, a mass of magnetite bodies or the like disposed on the screen and forming a filtering bed thereon, and means for subjecting the magnetic bodies to magnetic attraction to cause said bodies to jump up from the screen so as to provide for the release and removal of impurities engaged between the bodies, said means being mounted for movement in a path parallel to the surface of the bed to subject the said bodies in different portions of the bed to magnetic attraction.

17. In a filtering system, the combination with a filtering chamber having therein an elongated filter bed including a mass of magnetite, of magnetic means adapted to be intermittently energized, movable lengthwise of the filter bed for acting on the magnetic and causing agitation thereof.

18. In a filtering system including a filter bed composed of a mass of magnetite, the combination of a carriage traveling lengthwise of said bed and magnetic means movable by said carriage lengthwise of said bed and adapted to be intermittently energized for acting on the magnetite and causing agitation thereof.

19. In a filtering system, the combination with a filtering chamber having therein an elongated filter bed composed of a filter screen and a mass of magnetite resting on the screen, of a carriage traveling lengthwise of said bed and electro-magnetic means movable by said carriage along the surface of the magnetite and effective in both directions for acting on the magnetite and causing agitation thereof.

In testimony that we claim the foregoing as our invention, we have signed our names hereto.

WILLIAM C. LAUGHLIN.
ABRAHAM B. ASCH.